(12) United States Patent
Ewing

(10) Patent No.: US 11,912,197 B1
(45) Date of Patent: Feb. 27, 2024

(54) EMERGENCY WARNING AND LAW ENFORCEMENT IDENTIFICATION SYSTEM

(71) Applicant: Jimmie L. Ewing, Aurora, CO (US)

(72) Inventor: Jimmie L. Ewing, Aurora, CO (US)

(*) Notice: Subject to any disclaimer, the term of this patent is extended or adjusted under 35 U.S.C. 154(b) by 0 days.

(21) Appl. No.: 15/007,143

(22) Filed: Jan. 26, 2016

(51) Int. Cl.
*B60Q 9/00* (2006.01)
*B60R 1/00* (2022.01)
*B60R 1/02* (2006.01)

(52) U.S. Cl.
CPC ............... *B60Q 9/00* (2013.01); *B60R 1/006* (2013.01); *B60R 1/02* (2013.01)

(58) Field of Classification Search
CPC ........................................................ G60Q 9/00
USPC ............................................................ 726/17
See application file for complete search history.

(56) References Cited

U.S. PATENT DOCUMENTS

| | | | | |
|---|---|---|---|---|
| 5,337,358 A * | 8/1994 | Axelrod | ............. | G06Q 20/3821 235/379 |
| 5,844,987 A * | 12/1998 | Matthews | ............... | G08B 21/02 340/901 |
| 6,774,810 B2 * | 8/2004 | DeLine | ................... | B60K 35/00 248/549 |
| 6,822,580 B2 * | 11/2004 | Ewing | ................... | G08G 1/0965 180/167 |
| 7,057,528 B1 * | 6/2006 | Ewing | .................. | G08G 1/0965 180/167 |
| 9,224,294 B1 * | 12/2015 | St. John | ................ | G08G 1/0965 |
| 2002/0032510 A1 * | 3/2002 | Turnbull | .................... | B60R 1/12 701/49 |
| 2002/0198632 A1 * | 12/2002 | Breed | .................. | B60N 2/2863 701/1 |
| 2005/0270620 A1 * | 12/2005 | Bauer | ...................... | B60R 1/088 359/265 |
| 2006/0164230 A1 * | 7/2006 | DeWind | ................. | B60K 35/00 340/461 |
| 2007/0182248 A1 * | 8/2007 | Blaker | ...................... | B60L 1/00 307/10.1 |
| 2009/0091489 A1 * | 4/2009 | Banko | ....................... | B60R 1/12 342/20 |
| 2009/0119014 A1 * | 5/2009 | Caplan | .................... | G01C 21/26 701/469 |
| 2010/0001879 A1 * | 1/2010 | Boscacci | .............. | G08G 1/0965 340/903 |
| 2014/0062724 A1 * | 3/2014 | Varoglu | .................. | G08G 1/163 340/902 |
| 2015/0371539 A1 * | 12/2015 | Hawkins, Sr. | ........ | G08G 1/0962 340/902 |
| 2016/0171201 A1 * | 6/2016 | Schroder | .............. | H04B 5/0031 726/20 |
| 2016/0358466 A1 * | 12/2016 | Youngblood | ........ | G08G 1/0965 |

* cited by examiner

*Primary Examiner* — Albert K Wong

(57) ABSTRACT a system for authenticating the presence of an emergency vehicle and notifying the driver of a vehicle equipped with the disclosed system of the presence of the presence of the emergency vehicle and the type of emergency vehicle that is near or approaching. The system uses the mirror or other signaling device of the vehicle equipped with the disclosed system to notify the driver that the approaching vehicle is an official vehicle, and the identification of the governmental agency that controls the approaching vehicle.

2 Claims, 2 Drawing Sheets

EMERGENCY WARNING AND LAW ENFORCEMENT IDENTIFICATION SYSTEM

REFERENCE TO RELATED APPLICATIONS

This application claims the benefit of, and incorporates by reference in its entirety, my provisional application having Ser. No. 62/107,972, filed Jan. 26, 2015.

BACKGROUND OF THE INVENTION

(a) Field of the Invention

This application relates to a system for authenticating the presence of an emergency vehicle and notifying the driver of a vehicle equipped with the disclosed system of the presence of the presence of the emergency vehicle and the type of emergency vehicle that is near or approaching. The system uses the mirror or other signaling device of the vehicle equipped with the disclosed system to notify the driver that the approaching vehicle is an official vehicle, and the identification of the governmental agency that controls the approaching vehicle.

(b) Discussion of Known Art

In my U.S. Pat. Nos. 6,822,580, and 7,057,528 incorporated herein in their entirety by reference, I disclose a system that alerts drivers of approaching emergency vehicles, and of the direction that those vehicles are coming from. Here, I am disclosing the use of that system with an identification system that is incorporated within the rearview mirror, or other enclosure, in a passenger vehicle. The disclosed invention allows official personnel, such as police officers or paramedics, to verify to the driver of a passenger vehicle that the approaching vehicle is a legitimate emergency vehicle, and not an impersonator.

This invention allows uses transmitter within the official/emergency vehicle that sends an identification signal once the sirens or overhead lights are turned on. Alternatively, a transmitter that can be activated by the official personnel within the emergency vehicle to send an authenticating signal, which in turn causes a light or indicator in the passenger car rear view mirror to illuminate or activate, and thus confirming the authenticity of the approaching emergency vehicle or official personnel. Thus, the enclosed figures include legends like "push #2 sheriff" to indicate that a sheriff's vehicle has pushed a button or other signaling device that results in the illumination of the corresponding light or signal in the disclosed mirror of the passenger vehicle.

DRAWINGS

FIG. 3 illustrates the use of an antenna for receiving a signal from the official vehicle, such as a police car, highway patrol car, ambulance or the like.

Figure 4:
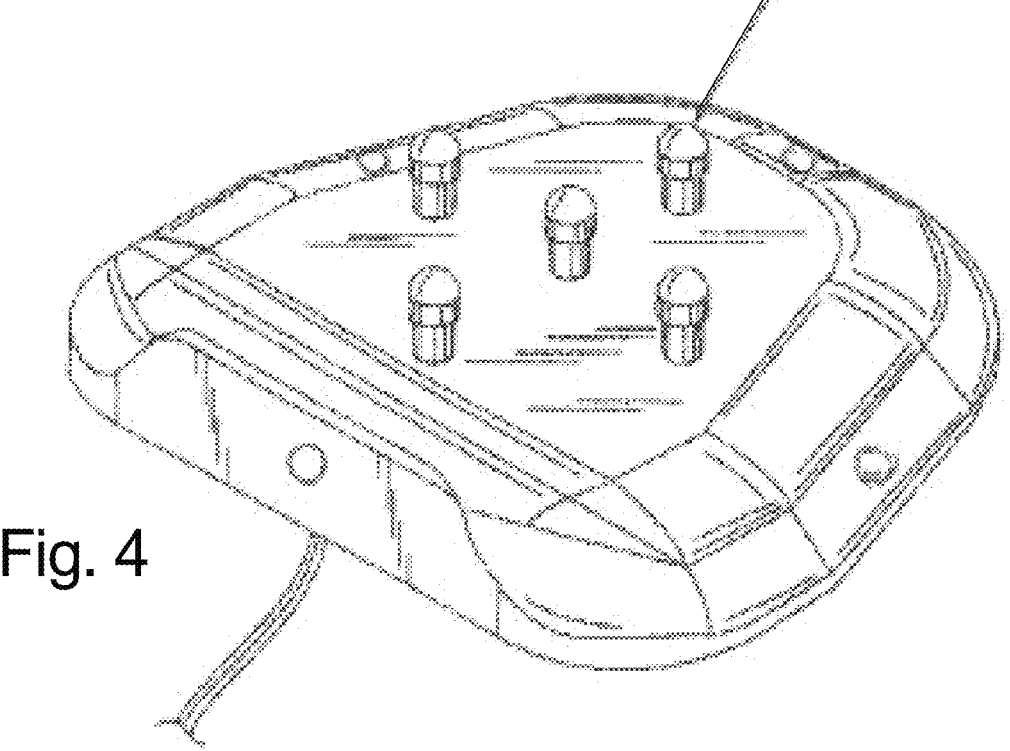

FIG. 4 illustrates the use of an antenna, such as the antenna disclosed in my U.S. Pat. Nos. 6,822,580, and 7,057,528, and includes cameras coupled to motion sensors that activate the cameras in order to allow the driver to observe approaching pedestrians or nearby vehicles.

DESCRIPTION OF PREFERRED EXEMPLAR EMBODIMENTS

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

Figure 1:
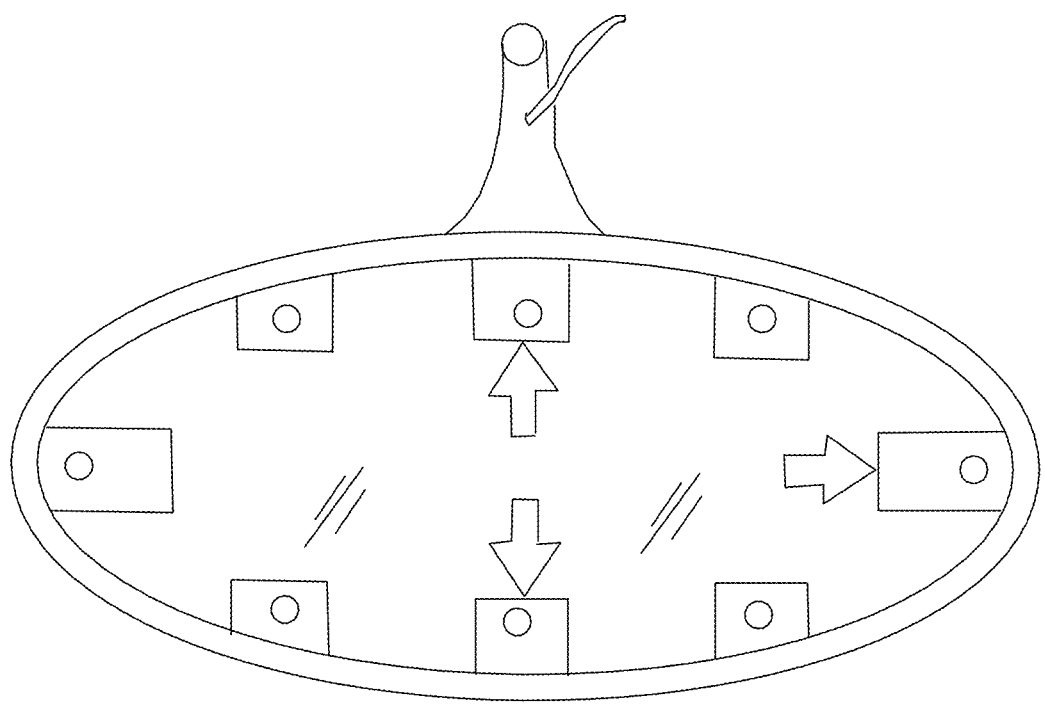
FIG. 1 shows an embodiment of my invention, with examples of verification signal locations on the face of the rearview mirror, and also shows the receiving antenna being positioned on the mirror support structure.
Figure 2:
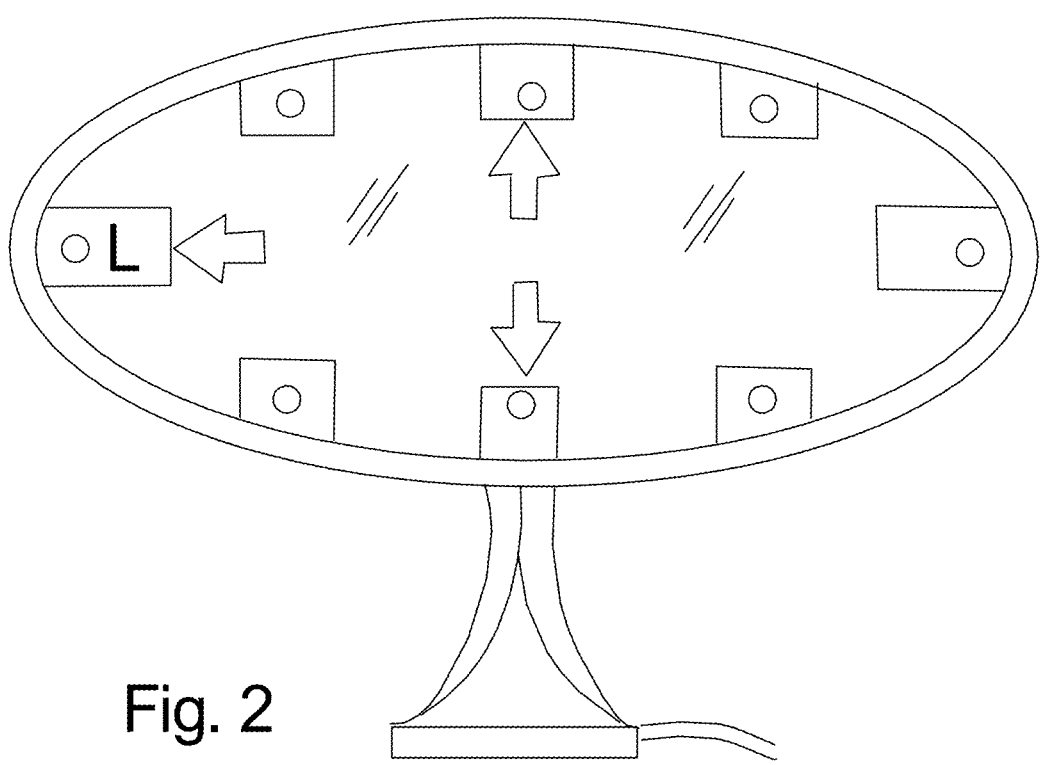
FIG. 2 shows an embodiment of my invention, with examples of verification signal locations on the face of the rearview mirror, and also shows the receiving antenna being positioned remotely, as on a rooftop.
Figure 3:
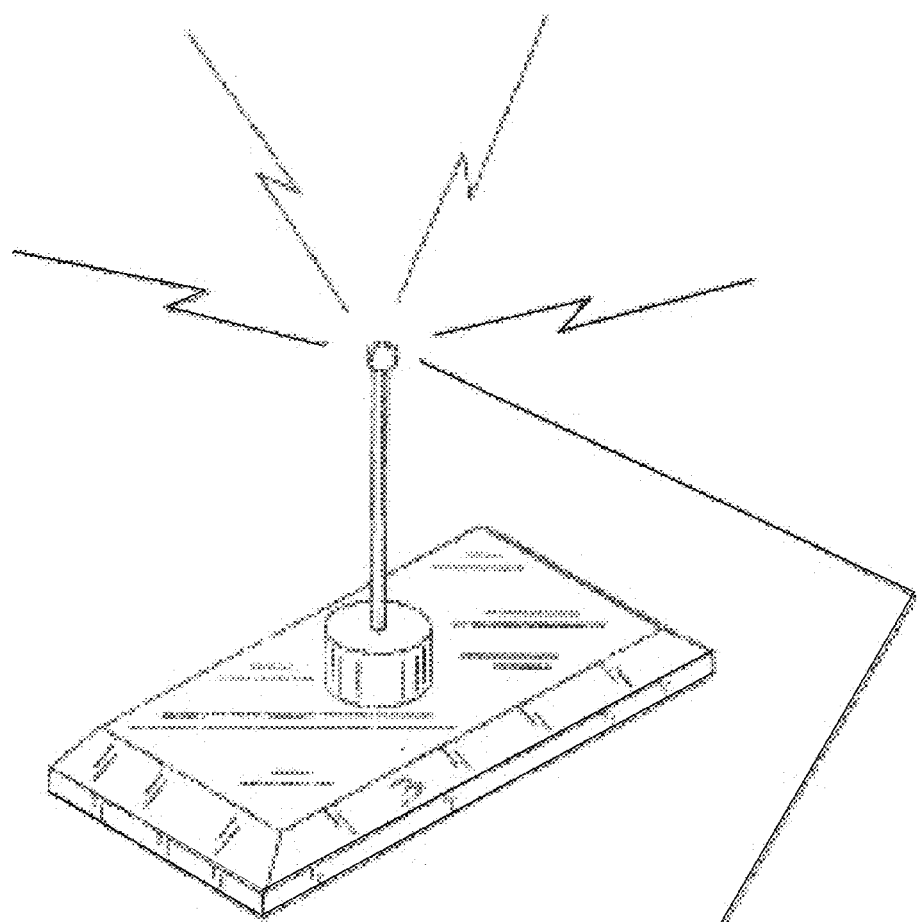

Turning now to FIG. 1 where a mirror that has been adapted for receiving a signal from an alert transmitter mounted from an official vehicle. The alert transmitter being configured such that it can be retrofitted inside law enforcement vehicles, such as state Patrols, Sheriff Department, Police Department, or other official vehicles. The alert transmitter will have a button to push, which will send an identification signal that is received in the passenger vehicle mirror. The passenger vehicle mirror will then use the signal to confirm that it is coming from an official vehicle, such as a police car. The confirmation will allow the driver of the passenger vehicle to feel safe about pulling over, since the authenticity of the approaching vehicle will have been verified. This will prevent civilian drivers from falling victim to police impersonators who mount flashing lights on their vehicles.

When stopping a citizen for a traffic violation, if a State Patrol, Sheriff, or Police Agent. It is also contemplated that the transmitter mounted in the will identify each agency, where they are from, and also provide other useful data, such as the speed, location, and trajectory of the official vehicle, which can be obtained from a GPS device in the official vehicle.

Other information, such as what agency and county and district, they are from. All transmitters will work in a similar fashion, and each agency will have their own (Code). (The (Code) just for Law Enforcement agency only, to notify the civilian driver that the approaching vehicle is not that of a police impersonator.

The only agency will have this (Code) Is Law Enforcement agent only, not (Fire Or Emergency Vehicles) The emergency vehicles will have the transmitter such as (Fire Trucks and Ambulances). Ambulances and fire truck will have the transmitter that will transmit from the emergency vehicles to the (Rooftop Antenna On The Citizen Vehicles To The Rear View Mirror In Citizen Vehicles) And what direction the emergency vehicles are coming from. From the rooftop antenna on the citizen vehicles, that will be (Night Vision And Infrared Camera) That the citizen can see in the rear view mirror who are approached them from both side if stop by (Law Enforcement Agency. The camera will automatic activate itself, when stop by (law Enforcement Agency, while stop on city Street and red lights and stop signs, in bad neighborhood, or on any side street. The civilian driver will be able to call for help, in any emergency situation. The (Camera) Will help the civilian driver identify an approaching suspect by pressing a button to push and record the approaching suspect as observed through the rearview mirror.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for allowing individuals in a civilian vehicle to verify that an approaching vehicle with flashing lights is an official vehicle, the system comprising:

a transmitter adapted for mounting in an official vehicle, the transmitter being adapted for sending an authentication signal; and a rearview mirror having a receiver adapted for receiving the authentication signal and indicating to the individuals in the civilian vehicle whether it is receiving an authentication signal corresponding to the official vehicle, so that the individual in the civilian vehicle can obtain visual verification that the official vehicle is behind the civilian vehicle, while obtaining the authentication signal corresponding to the official vehicle, the rearview mirror including indicators corresponding to the specific type of official vehicle the authentication signal is received from.

2. The system of claim 1 and further comprising at least one indicator incorporated into the rearview mirror for informing the individuals in the civilian vehicle of a direction of travel of an approaching official vehicle.

\* \* \* \* \*